(12) United States Patent
Kasahara et al.

(10) Patent No.: US 10,679,581 B2
(45) Date of Patent: Jun. 9, 2020

(54) INFORMATION PROCESSING TERMINAL APPARATUS

(71) Applicant: SONY CORPORATION, Tokyo (JP)

(72) Inventors: Shunichi Kasahara, Kanagawa (JP); Tomohiro Tsunoda, Tokyo (JP); Takahito Migita, Tokyo (JP); Kei Takahashi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/095,677

(22) PCT Filed: Mar. 8, 2017

(86) PCT No.: PCT/JP2017/009340
§ 371 (c)(1),
(2) Date: Oct. 22, 2018

(87) PCT Pub. No.: WO2017/187807
PCT Pub. Date: Nov. 2, 2017

(65) Prior Publication Data
US 2019/0156784 A1 May 23, 2019

(30) Foreign Application Priority Data
Apr. 28, 2016 (JP) .................................. 2016-090175

(51) Int. Cl.
*G09G 5/00* (2006.01)
*H04N 5/225* (2006.01)
(Continued)

(52) U.S. Cl.
CPC ............... *G09G 5/00* (2013.01); *H04N 5/225* (2013.01); *H04N 7/14* (2013.01); *H04N 7/147* (2013.01); *H04N 7/15* (2013.01); *H04N 7/18* (2013.01)

(58) Field of Classification Search
CPC ............ G09G 5/00; H04N 5/225; H04N 7/14; H04N 7/18
See application file for complete search history.

(56) References Cited

U.S. PATENT DOCUMENTS 7,646,967 B2 * 1/2010 Kato ..................... G11B 27/034
386/241
2015/0073907 A1 * 3/2015 Purves .................. G06Q 20/32
705/14.58

(Continued)

FOREIGN PATENT DOCUMENTS

| JP | 2001-195491 A | 7/2001 |
| JP | 2015-115723 A | 6/2015 |
| WO | 2015/060393 A1 | 4/2015 |

OTHER PUBLICATIONS

Kasahara, et al., "JackIn: Integrating the First Person View with Out-of-Body Vision Generation for Human-Human Augmentation", IPSJ Interaction, 2014, 08 pages.

(Continued)

*Primary Examiner* — Ricardo Osorio
(74) *Attorney, Agent, or Firm* — Chip Law Group

(57) ABSTRACT

An information processing terminal apparatus for sending an image taken of real-estate properties is provided. A video reproducing apparatus sends annotation information indicative of a tracking point to a video providing apparatus. At the video providing apparatus side, if spatial tracking of annotation information is enabled, the annotation information is overlay-displayed on a video currently being taken of the video providing apparatus. On the other hand, if spatial tracking of annotation information is disabled, a video having annotation information sent from the video reproducing apparatus is displayed on a display block 510 of the video providing apparatus without change, thereby assuring temporal and spatial lags.

4 Claims, 13 Drawing Sheets

(51) Int. Cl.
*H04N 7/18* (2006.01)
*H04N 7/15* (2006.01)
*H04N 7/14* (2006.01)

(56) References Cited

U.S. PATENT DOCUMENTS

2016/0209648 A1* 7/2016 Haddick ............ G02B 27/0093
2016/0277710 A1   9/2016 Oyama
2017/0269685 A1*  9/2017 Marks ................... A63F 13/533

OTHER PUBLICATIONS

International Search Report and Written Opinion of PCT Application No. PCT/JP2017/009340, dated May 16, 2017, 16 pages of ISRWO.
Kasahara, et al., "JackIn: Integrating First-Person View With Out-of-Body Vision Generation for Human-Human Augmentation", Mar. 7-9, 2014, 08 pages.
Kasahara, et al., "JackIn: Integrating First-Person View with Out-of-Body Vision Generation for Human-Human Augmentation", 2014 Information Processing Society of Japan, Mar. 7-9, 2014, 08 pages.

* cited by examiner

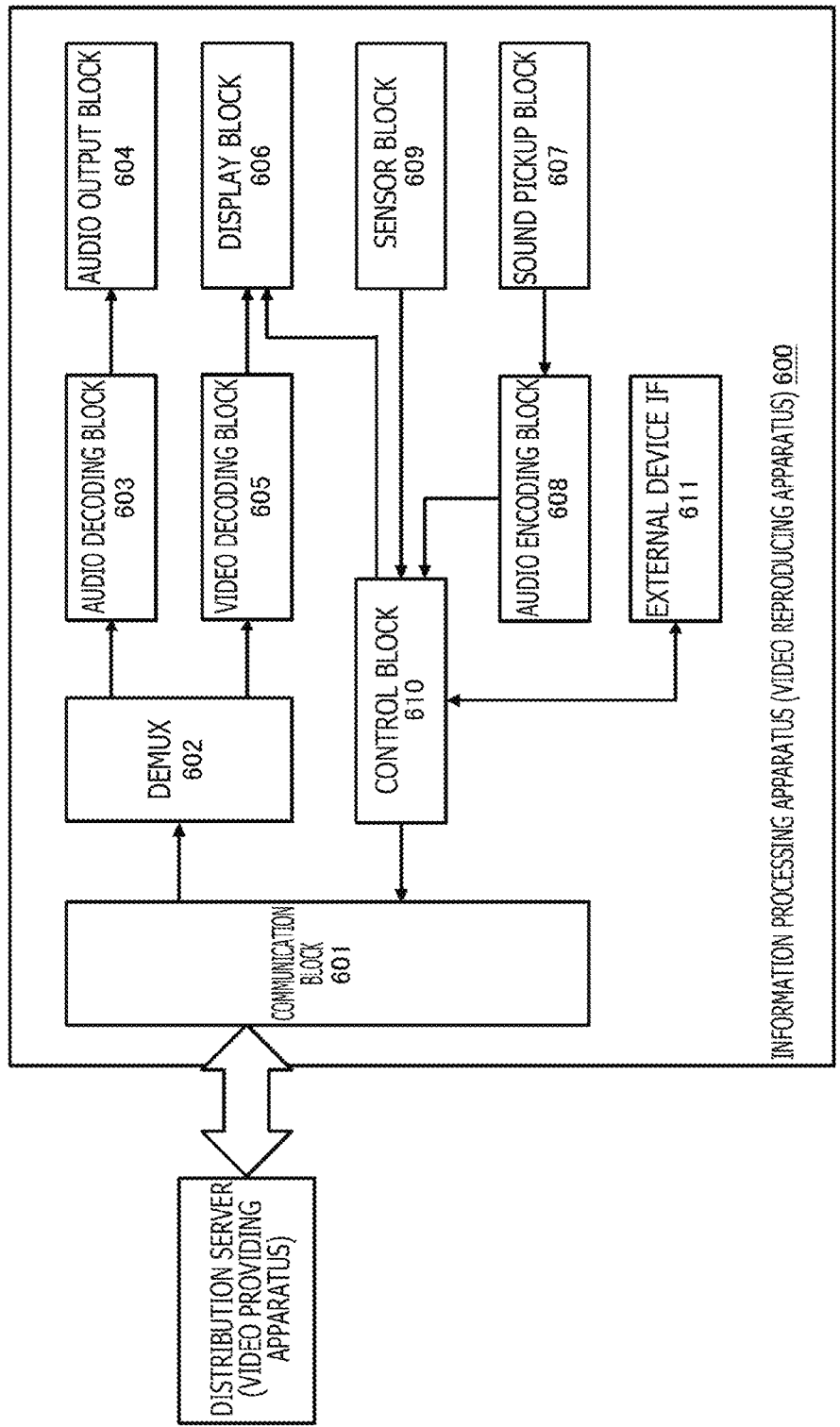
F I G. 6

FIG. 8
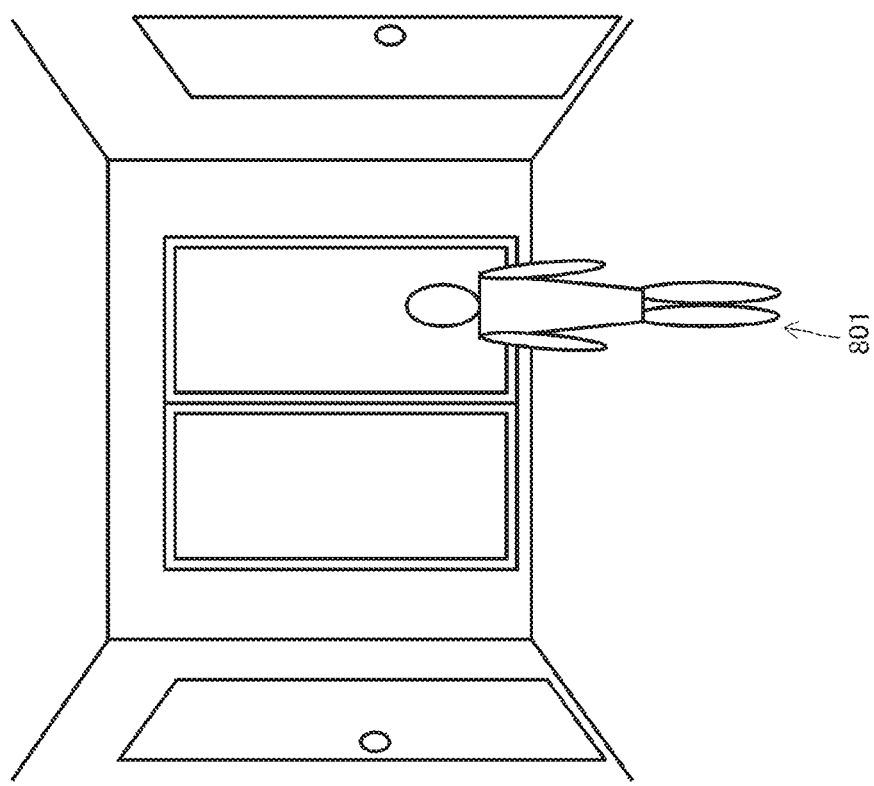
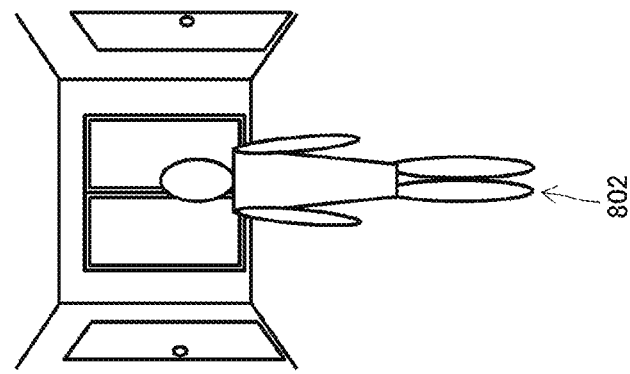

INFORMATION PROCESSING TERMINAL APPARATUS

CROSS REFERENCE TO RELATED APPLICATIONS

This application is a U.S. National Phase of International Patent Application No. PCT/JP2017/009340 filed on Mar. 8, 2017, which claims priority benefit of Japanese Patent Application No. JP 2016-090175 filed in the Japan Patent Office on Apr. 28, 2016. Each of the above-referenced applications is hereby incorporated herein by reference in its entirety.

TECHNICAL FIELD

A technology disclosed herein relates an information processing terminal apparatus for sending a taken image, an information processing terminal apparatus for sending a taken image of a real-estate property, for example.

BACKGROUND ART

In signing the purchase or lease of an apartment room or a house, it is a general practice to go for a private view inside the property concerned in advance. However, the properties for which a customer desires to go for a private view are not always concentrated in one place, in which a customer is able to view only three to four properties a day, lowering the efficiency of private viewing.

For example, a real-estate property sale assist system was proposed in which a first database for storing the three-dimensional geometric data of real-estate properties and a second database for storing the interior information of the real-estate properties as three-dimensional geometric data are arranged as browsable via the Internet and, at the same time, the insides of real-estate properties are displayed as virtual spaces on the basis of the three-dimensional geometric data read from the first and second databases (refer to PTL 1 below, for example). According to this system, the insides of housing spaces can be presented to property purchasers as virtual spaces based on the housing-space three-dimensional geometric data and the housing-space interior information three-dimensional geometric data.

CITATION LIST

Patent Literature

[PTL 1]
JP 2001-195491A

SUMMARY

Technical Problems

An object of the technology disclosed herein is to provide an information processing terminal apparatus for sending a taken image.

Solution to Problems

The technology disclosed herein has been made taking such a problem as described above into consideration and according to a first aspect thereof, there is provided an information processing terminal apparatus. This information processing terminal apparatus has an image-taking block; a sending block configured to send an image taken by the image-taking block; a receiving block configured to receive a predetermined signal from an external device; a display block; and a control block, in which, on a basis of temporal or spatial difference between information included in the predetermined signal and an image currently being taken with the image-taking block, the control block makes the display block display the information.

According to a second aspect of the technology disclosed herein, the receiving block of the information processing terminal apparatus associated with the first aspect is configured to receive additional information for an object identified by the external device, and the control block is configured to control displaying of the additional information on the basis of the temporal or spatial difference. The additional information includes, for example, annotation information that is inputted in the external device.

According to a third aspect of the technology disclosed herein, on a basis of whether tracking of the object is enabled within an image currently being taken with the image-taking block, the control block of the information processing terminal apparatus associated with the second aspect is configured to control displaying of the additional information on the basis of the temporal or spatial difference.

According to a fourth aspect of the technology disclosed herein, the control block of the information processing terminal apparatus associated with the second aspect is configured to convert the object that is trackable into a position on an image currently being taken with the image-taking block, thereby causing the additional information to be displayed on the converted object.

According to a fifth aspect of the technology disclosed herein, the control block of the information processing terminal apparatus associated with the second aspect is configured to cause additional information for the object that is not trackable within an image currently being taken with the image-taking block to be displayed by use of a video of a point of time at which the object is displayed.

Advantageous Effects of Invention

According to the technology disclosed herein, an information processing terminal apparatus for sending a taken image can be provided.

It should be noted that the effects cited herein are illustrative only and therefore the effects of the present invention are not restricted thereto. Also, the present invention may bring about additional effects other than the effects described above.

Other objects, features, and advantages of the technology disclosed herein will be clarified by detail description based on embodiments to be described later and drawings attached hereto.

BRIEF DESCRIPTION OF DRAWINGS

FIG. 6 is a diagram schematically illustrating a functional configuration of an information processing apparatus 600 capable of functioning as a video reproducing apparatus.

FIG. 8 is a diagram illustrating an example in which the video viewing system 100 is applied to the private viewing of real-estate properties.

DESCRIPTION OF EMBODIMENTS

The following describes embodiments of a technology disclosed herein in detail with reference to attached drawings.

A. System Overview

A-1. System Configuration

Figure 1:
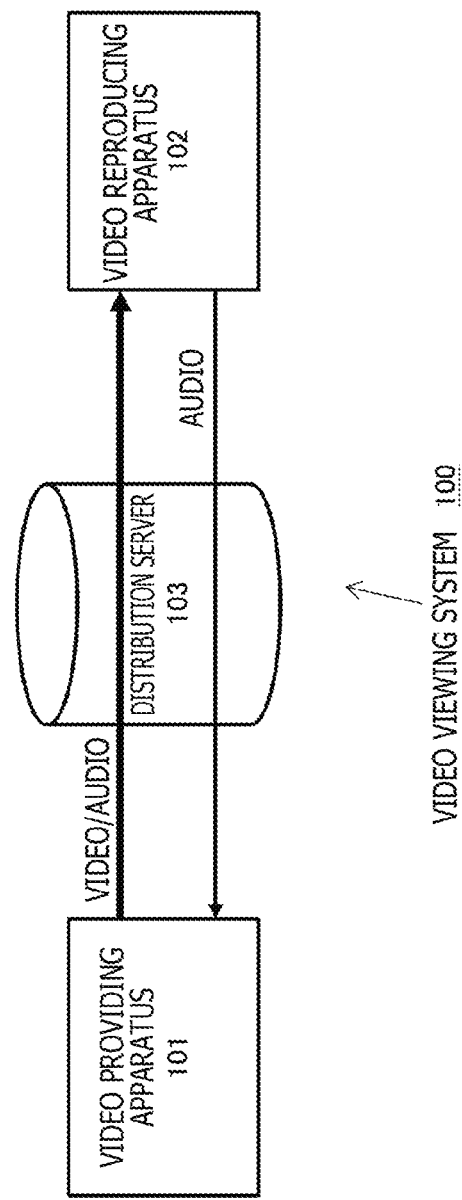
FIG. 1 is a diagram schematically illustrating a configurational example of a video viewing system 100 for viewing videos.

Now, FIG. 1 schematically illustrates a configurational example of a video viewing system 100 for viewing a video. The video viewing system 100 has one unit of video providing apparatus 101 for providing videos and one unit of video reproducing apparatus 102 for reproducing videos, which makes of one-to-one network topology. The video providing apparatus 101 and the video reproducing apparatus 102 are interconnected via a wireless or wired LAN (Local Area Network) or a wide area network such as the Internet.

The video providing apparatus 101 is an information terminal that is manipulated by a user (a privately viewing person or a sales person of a real-estate company) who is at a real-estate property (the site thereof). Alternatively, the video providing apparatus 101 may be a fixed-point camera installed at a site or a camera installed on a robot that autonomously operates at a site. Further, the video reproducing apparatus 102 is an information terminal and the like that is manipulated by a user (a prospective customer considering the purchase of a real-estate property or the contract of lease) who browses the information of properties at a place (for example, a real-estate shop or a home) away from the site without visiting it.

The video providing apparatus 101 has an image-taking block for taking videos (for example, viewpoint videos of a sales person at the site of a real-estate property) with the installation place of the video providing apparatus 101 being the viewpoint position and sends the taken videos to the video reproducing apparatus 102. For example, the image-taking block may include one all-sky camera. In this case, however, an all-sky video may not necessarily span 360 degrees; therefore, all-sky video may lack a part of field of view (this holds true with the following description).

The video providing apparatus 101 further may have an audio input block such as a microphone and multiplex the audio picked up at an image-taking site of an all-sky video with a video, thereby sending the multiplexed audio and video to the video reproducing apparatus 102. For example, a sales person at the site of a real-estate property may pick up the audio explaining the locational conditions and layouts of the property and send the picked up audio to the video reproducing apparatus 102.

In addition, the video providing apparatus 101 may have a display block. A display block (or the video providing apparatus 101 itself) is configured as a head-mounted display of transmission type, for example. A user at the site wears this head-mounted display around the head and takes images of the site and explains the property, while appropriately referencing videos displayed on the head-mounted display in a see-through manner.

On the other hand, the video reproducing apparatus 102 has a display block on which the video received from the video providing apparatus 101 is displayed. The video reproducing apparatus 102 (or the display block thereof) is configured as a head-mounted display that is worn by the user around the head so as to view the video, for example. For example, the video reproducing apparatus 102 clips a predetermined angle of view from an all-sky video (a video of the inside of a real-estate property) taken with the video providing apparatus 101 and displays the clipped angle of view. Alternatively, the video reproducing apparatus 102 may be configured as a dome-type display so as to display the entire all-sky video that is taken at the place where video providing apparatus 101 is installed. For details of a dome-type display, refer to Japanese Patent Application No. 2015-245710, description already assigned to the applicant hereof, for example. Alternatively, the video reproducing apparatus 102 may also be an ordinary (or a large screen) monitor display.

The video reproducing apparatus 102 may have an audio output block such as a speaker or a headphone so as to reproducingly output audio (for example, the audio of a sales person at the site of a real-estate property who is explaining the locational conditions and layouts) sent from the video providing apparatus 101 as multiplexed with video along with the video.

Further, the video reproducing apparatus 102 may further has an audio input block such as a microphone through which to input user audio instructions. For example, the user of the video reproducing apparatus 102 is able to input audio instructions such as "I want to see the scenery from the veranda," "Show me the living room," and so on. Such instructions are sent to the video providing apparatus 101.

It is also practicable to provide direct communication between the video providing apparatus 101 and the video reproducing apparatus 102; however, the mediation of a distribution server 103 is assumed in the description below. The video providing apparatus 101 sends an all-sky video taken at the site to the distribution server 103 once. The distribution server 103 sends the all-sky video or a predetermined view angle video clipped from the all-sky video to the video reproducing apparatus 102. Also, the distribution server 103 archives the video received from the video providing apparatus 101.

The video viewing system 100 illustrated in FIG. 1 configures a one-to-one network topology with one video providing apparatus 101 and one video reproducing apparatus 102. For example, this configuration corresponds to an embodiment in which a video taken with one video providing apparatus 101 installed at a particular property is viewed with one video reproducing apparatus 102 installed at a real-estate shop. Since a customer can view many properties with a real video with nearly a real feeling even without visiting the sites, efficient private viewing can be realized, thereby enhancing customer satisfaction.

Figure 2:
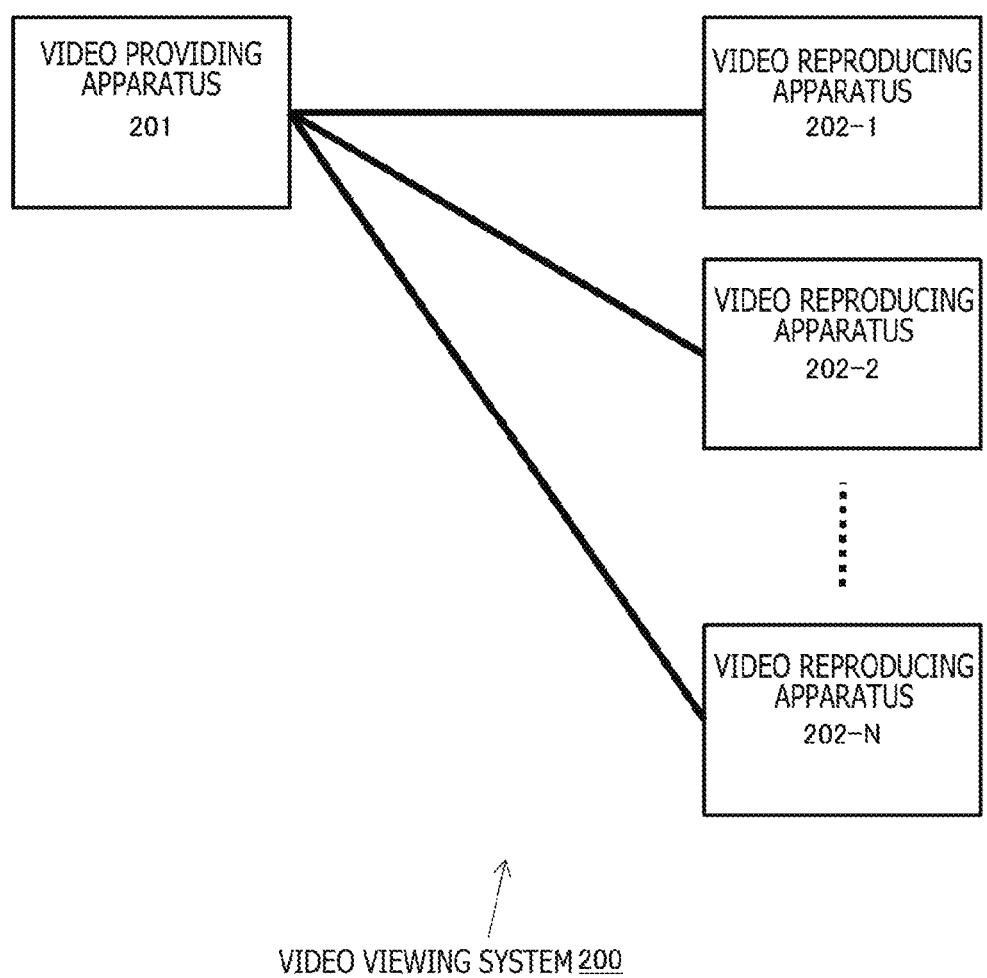
FIG. 2 is a diagram schematically illustrating a configurational example of a video viewing system 200 for viewing videos.
Figure 3:
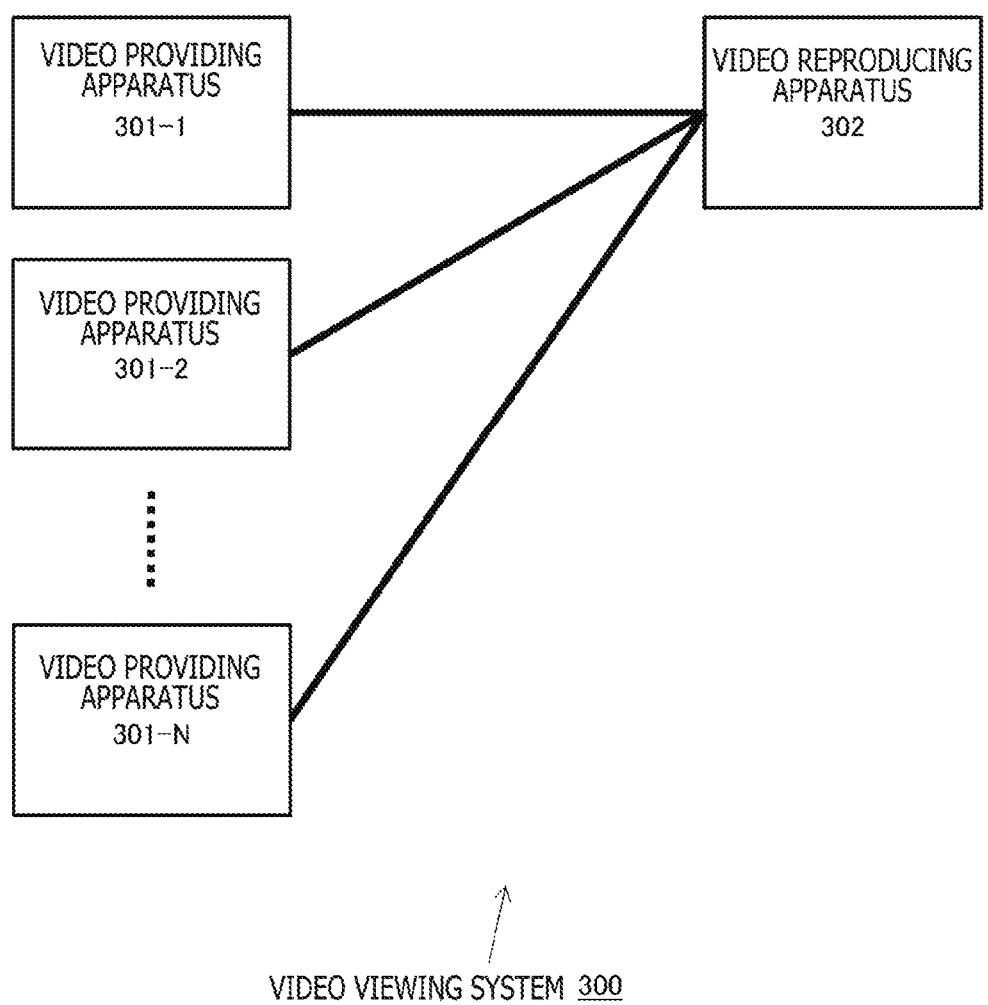
FIG. 3 is a diagram schematically illustrating a configurational example of a video viewing system 300 for viewing videos.
Figure 4:
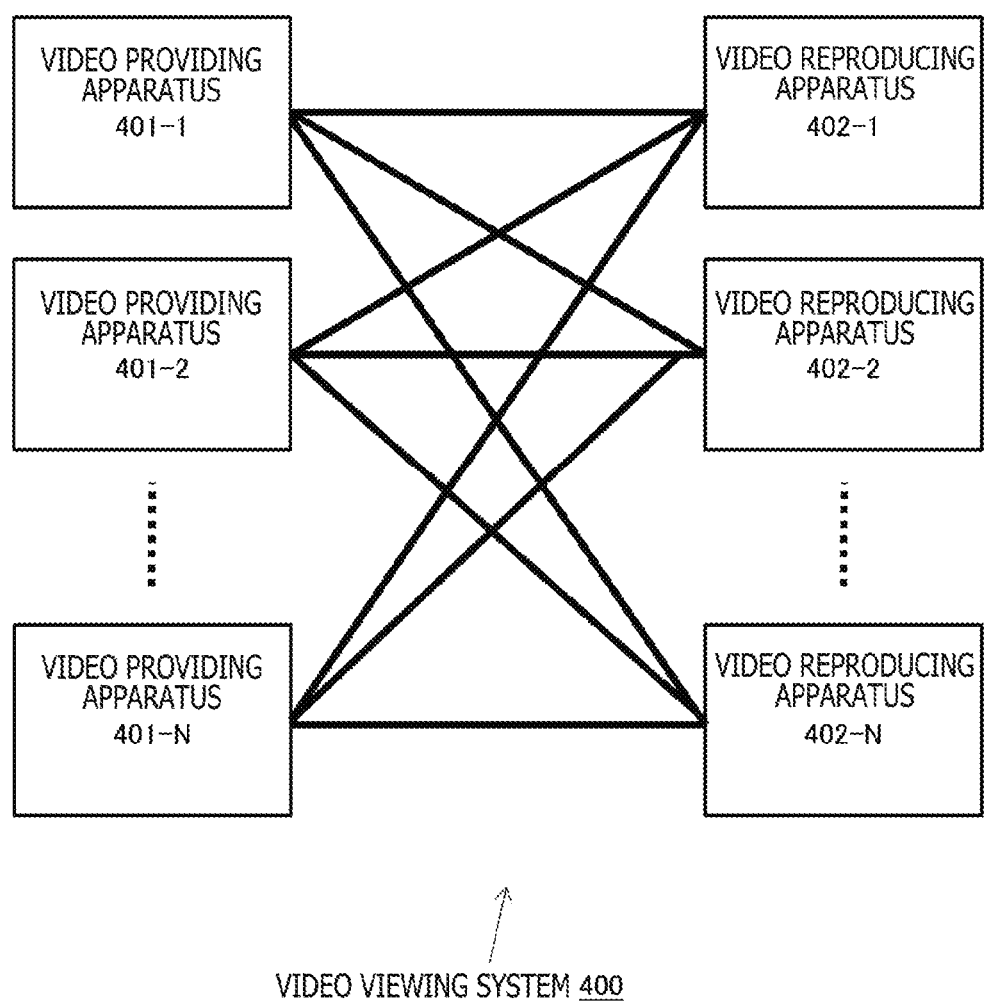
FIG. 4 is a diagram schematically illustrating a configurational example of a video viewing system 400 for viewing videos.

By contrast, FIG. 2 through FIG. 4 illustrate variations to the video viewing system 100 for viewing all-sky videos. The video viewing system 200 illustrated in FIG. 2 configures a one-to-N network topology with one video providing apparatus 201 and plural (N units of) video reproducing apparatuses 202-1, 202-2, . . . , 202-N, in which an all-sky video taken with one video providing apparatus 201 (the same video taken in the same line-of-sight direction at the same viewpoint position) is viewed with the video reproducing apparatuses 202-1, 202-2, . . . 202-N at the same time. For example, this configuration corresponds to an embodiment in which the video of a particular property taken with one video providing apparatus 201 installed at the property is viewed with plural video reproducing apparatuses 202-1, 202-2, . . . , 202-N installed at a real-estate shop (or installed at each of two or more branches of a real-estate company). Since the real video of one property can be viewed by two or more customers in a shared manner, efficient private viewing can be realized for a real-estate company.

A video viewing system 300 illustrated in FIG. 3 configures a N-to-one network topology with plural (N units of) video providing apparatuses 301-1, 301-2, . . . 301-N and one video reproducing apparatus 302, in which one video reproducing apparatus 302 receives and displays a video selectively from any one of the video providing apparatuses 301-1, 301-2, . . . 301-N installed at different places. It is assumed that the video reproducing apparatus 302 be capable of dynamically switching between the video providing apparatuses 301-1, 301-2, . . . 301-N from which videos are sent. When the video providing apparatus 301 that is a video source is selected, the viewpoint position of a video that is reproduced (viewable) with the video reproducing apparatus 302 is switched (the viewpoint position instantaneously moves to the installation place of the selected video providing apparatus 301). Further, it is assumed that the video reproducing apparatus 302 be capable of instructing the selected video providing apparatus 301 to switch between line-of-sight directions. For example, this configuration corresponds to an embodiment in which one video reproducing apparatus 302 installed at a real-estate shop views in a switching manner the videos sent from the plural video providing apparatuses 301-1, 301-2, . . . 301-N installed at two or more properties. Alternatively, an embodiment is also assumed that the videos from the plural video providing apparatuses 301-1, 301-2, . . . 301-N installed in rooms of one real-estate property are viewed in a switching manner with the video reproducing apparatus 302. Since customers are able to view the real video of each property at once even without visiting each property with nearly a real feeling, thereby realizing efficient private viewing and, at the same time, enhancing customer satisfaction.

Further, a video viewing system 400 illustrated in FIG. 4 configures an N-to-N network topology with plural (N units of) video providing apparatuses 401-1, 401-2, . . . , 401-N and plural (N units of) video reproducing apparatuses 402-1, 402-2, . . . , 402-N. The N-to-N network topology can include the one-to-one network illustrated in FIG. 1, the one-to-N network illustrated in FIG. 2, and the N-to-one network illustrated in FIG. 3. For example, this configuration corresponds to an embodiment in which each of the plural video reproducing apparatuses 402-1, 402-2, . . . , 402-N installed at a real-estate shop (or at two or more branches of a real-estate company) views the videos from the plural video providing apparatuses 401-1, 401-2, . . . , 401-N installed at two or more properties by switching between the videos. Since customers are able to view the real video of each property at once even without visiting each property with nearly a real feeling, thereby realizing efficient private viewing and, at the same time, enhancing customer satisfaction.

While an all-sky video is provided by the video providing apparatus, the video reproducing apparatus side may, if a video in any one of line-of-sight directions, rather than all skies, is viewed, define the line-of-sight direction in which a video is viewed with the video reproducing apparatus as "audiovisual data," thereby managing the audiovisual data with a distribution server in a concentrated manner. In addition, if an all-sky video from one video providing apparatus is viewed with two or more video reproducing apparatuses as illustrated in FIG. 2 and FIG. 4, the audiovisual data of each video reproducing apparatus may be shared for mutual use. Further, in distributing an archive video from a distribution server, summary results of the past audiovisual data may be used.

B. Apparatus Configuration

B-1. Configuration of the Video Providing Apparatus

Figure 5:
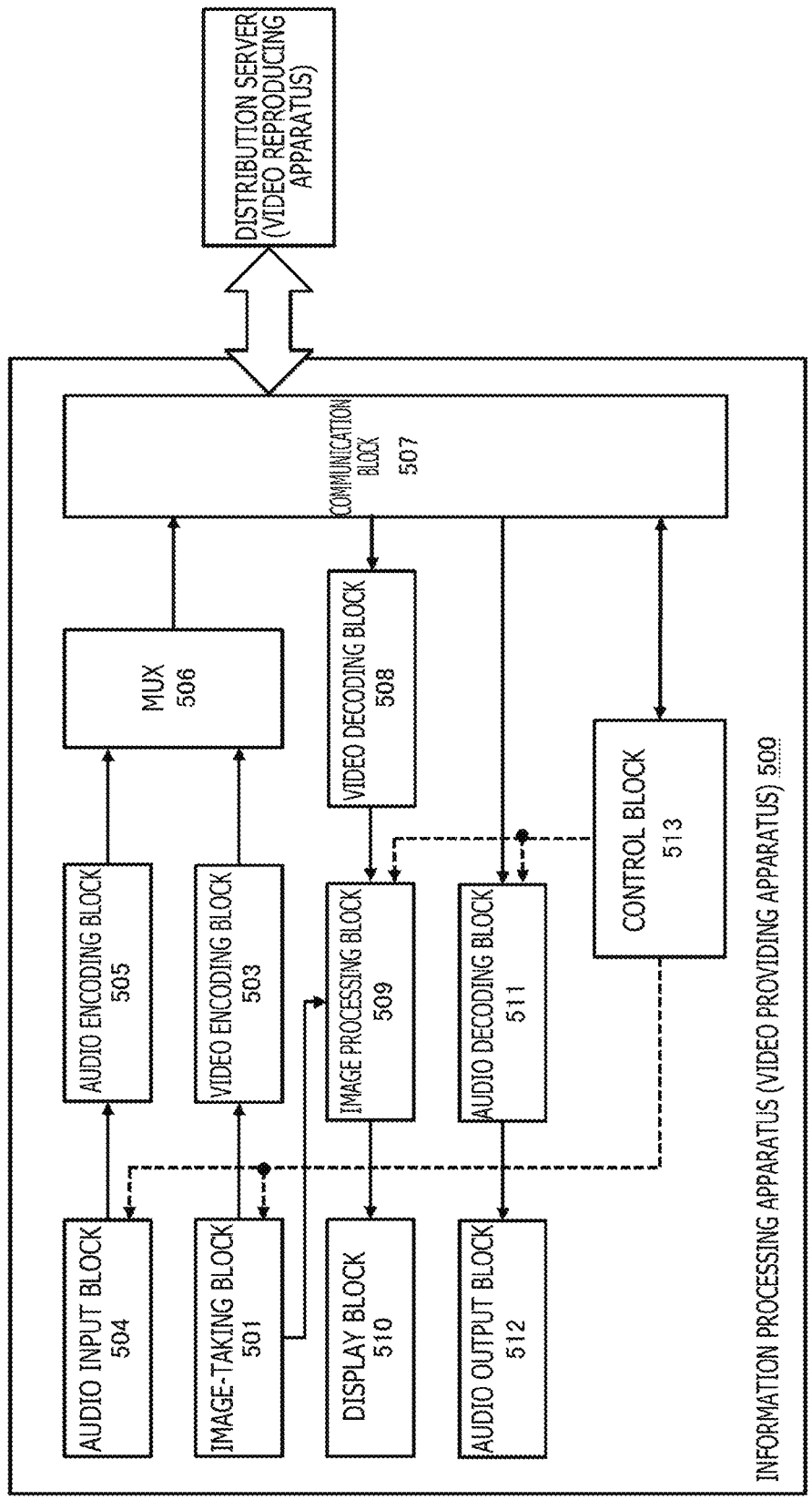
FIG. 5 is a diagram schematically illustrating a functional configuration of an information processing apparatus 500 capable of functioning as a video providing apparatus.

FIG. 5 schematically illustrates a functional configuration of an information processing apparatus 500 that is functional as a video providing apparatus in the video viewing systems 100 through 400. The illustrated information processing apparatus 500 has an image-taking block 501, a video encoding block 503, an audio input block 504, an audio encoding block 505, a multiplexing (MUX) block 506, a communication block 507, a video decoding block 508, an image processing block 509, a display block 510, an audio decoding block 511, an audio output block 512, and a control block 513. The following describes the components 501 through 513.

The image-taking block 501 includes a monocular camera (including a wide-angle camera and a fish-eye camera), a binocular stereo camera, a multi-eye all-sky camera, or the like. Use of a stereo camera gives the feeling of depth to a video. The image-taking block 501 takes images of surroundings with a place of installation of the information processing apparatus 500 being a viewpoint position. The video encoding block 503 executes encoding processing on the video signal taken by the image-taking block 501.

The audio input block 504 including a small-size microphone, stereo microphone, or the like, for example, can pick up the audio at an image-taking site of an all-sky video by arranging along with the image-taking block 501. Use of a stereo microphone can stereoscopically reconfigure the sound at the time of sound pickup on the reproducing side (namely, a video reproducing apparatus). The audio encoding block 505 executes encoding processing on the audio signal inputted through the audio input block 504.

The multiplexing (MUX) block 506 multiplexes an encoded video signal and an encoded audio signal that are encoded by the video encoding block 503 and the audio encoding block 505, respectively, and forms the resultant multiplexed signal into a signal format (a packet) for the transmission to a video reproducing apparatus via a distribution server.

The display block 510 (or the entire video providing apparatus 500) is configured as a transmission-type head-mounted display, for example. Alternatively, the display block 510 (or the entire video providing apparatus 500) is configured as a portable information terminal (with a camera) such as a smartphone or a tablet. The display block 510 displays, in a superimposed manner, a video to the field-of-view of a user taking the video of a property at a site. The video decoding block 508 decodes an archive video received from a distribution server, for example. The image processing block 509 executes image recognition and other processing operations in an image taken with the image-taking block 501 or the video decoded with the video decoding block 508 so as to generate a video to be displayed on the display block 510. The display block 510 displays, to the user, such guidance information as a visiting destination and a visiting route, for example. In addition, the display block 510 is capable of a variety of annotation information such as a comment of the user of a video reproducing apparatus and the information added related with real-estate properties (questions and impressions associated with layout, furniture, and facilities, and the attribute information associated with properties).

The audio decoding block 511 decodes the encoded audio signal received from a video reproducing apparatus, for example. The audio output block 512 audibly outputs a decoded baseband audio signal. For example, audio instructions such as "I want to see the scenery from the veranda" or "Show me the living room" by a user of the video reproducing apparatus are audibly outputted at a site.

The communication block 507 executes mutual communication like the transmission of video and audio with a video reproducing apparatus. However, the communication with a video reproducing apparatus requires the mediation of a distribution server (as described above). The communication block 507 executes mutual communication with a video reproducing apparatus, a distribution server, and other external apparatuses via a wireless or wired LAN or a wide-area network such as the Internet.

The control block 513 controls the operations of the components 501 through 512 in an overall manner. For example, the control block 513 executes the processing of realizing real-time communication with a video reproducing apparatus (or a viewing group) to which video is sent and the processing of a video to be displayed to a user (a person taking a video of the property at the site) at the display block 510. Further, in order to restrict the range of the information to be provided in accordance with the attribute information of a video reproducing apparatus (or a viewing group) to which a video is sent, the control block 513 executes turn on/off of an image-taking operation or an audio input operation, mosaic or masking processing on a taken video, and input audio modulation processing.

B-2. Configuration of the Video Reproducing Apparatus

FIG. 6 schematically illustrates a functional configuration of an information processing apparatus 600 that is functional as a video reproducing apparatus in the video viewing systems 100 through 400. The illustrated information processing apparatus 600 has a communication block 601, a demultiplexer (DEMUX) 602, an audio decoding block 603, an audio output block 604, a video decoding block 605, a display block 606, a sound pickup block 607, an audio encoding block 608, a sensor block 609, a control block 610, and an external device interface 611. The following describes the components 601 through 611.

The communication block 601 executes mutual communication like the transmission of video and audio with a video providing apparatus. As requires, communication with a distribution server (described above) is executed via the communication block 601. The communication block 601 executes mutual communication with a video providing apparatus, a distribution server, and other external apparatuses via a wireless or wired LAN or a wide-area network such as the Internet, for example.

For example, a send start request for video and audio is sent from the communication block 601 to a video providing apparatus installed at a place where a user wants to view the video (for example, a real-estate property to be privately viewed). Then, a transmission signal formed into a predetermined signal format (a packet) is received by the communication block 601 from the video providing apparatus. In addition, while a video received from a certain video providing apparatus is being displayed (namely, being viewed by a user), if the user wants to see in a different line-of-sight direction at that viewpoint position, a line-of-sight direction change request is sent from the communication block 601. Further, if the user wants to switch the current video to a video sent from another video providing apparatus, a send stop request is sent to the video providing apparatus receiving video and audio from the communication block 601 and, at the same time, a send start request is sent to a video providing apparatus to be switched from the communication block 601.

The demultiplexer (DEMUX) 602 separates a multiplexed signal sent from a video providing apparatus into an encoded video signal and an encoded audio signal and distributes these signals to the audio decoding block 603 and the video decoding block 605, respectively.

The audio decoding block 603 decodes the encoded audio signal to generate a baseband audio signal and audibly outputs the generated signal from the audio output block 604. The audio output block 604 includes a monaural, stereo, or multi-channel speaker, for example.

The video decoding block 605 decodes the encoded video signal so as to generate a baseband video signal, thereby displaying the video taken with the video providing apparatus from which the encoded video signal was received onto the display block 606. The display block 606 (or the information processing apparatus 600 main) includes a head-mounted display, a dome-type display, or a large-screen (or normal-screen) monitor display.

The sound pickup block 607 including a small-size microphone, a stereo microphone, or the like, for example, picks up user audio and so on. The audio encoding block 608 encodes an audio signal entered through the sound pickup block 607 and outputs the encoded audio signal to the control block 610. The user audio may include impressions and admirations to a video displayed on the display block 606 and audio instructions (for example, the change of line-of-sight directions of all-sky video) to the control block 610 (or the video reproducing apparatus).

A user of a video reproducing apparatus can issue audio instructions such as "I want to see the scenery from the veranda," "Show me the living room," and so on, while viewing the video of the real-estate property to be privately viewed on the display block 606, for example. This user audio is picked up through the sound pickup block 607 to be encoded by the audio encoding block 608, the encoded user audio being subsequently sent from the communication block 601 to the video providing apparatus.

The control block 610 controls the outputs of the video and audio received from the video providing apparatus. In addition, the control block 610 controls the displaying of UI and OSD (On-Screen Display) for the screen of the display block 606 and processes user (viewer) manipulations done on UI and OSD.

The sensor block 609 measures the line-of-sight direction, head position, or attitude of a user (a viewer who views a video displayed on the screen of the display block 606). The sensor block 609 is configured by a combination of two or more sensor devices such as a gyro sensor, an acceleration sensor, and a geomagnetic sensor, for example (sensors that can detect a total of nine axes of a three-axis gyro sensor, a three-axis acceleration sensor, and a three-axis geomagnetic sensor, for example). The sensor block 609 may be integrated with the information processing apparatus 600 main body (a head-mounted display or the like) or may be an accessory part that is externally attached to the main body.

User operations such as a line-of-sight direction, a head position, or an attitude (or not only the head but also gesture operations using the body and the hands and the legs) that are detected by the sensor block 609 may be manipulations done on UI and OSD displayed on the display block 609 or instructions of view angles to be displayed on the display block 609 in an all-sky video. For example, the shaking and nodding of the user head (or looking right and left and up and down) can be handled as the instructions of changing the line-of-sight directions in an all-sky video. Further, user operations of tilting forward and backward of the body may be handled as a camera zooming manipulation in the current line-of-sight direction (zooming in is realized by the forward tilting and zooming out is realized by the backward tilting). Then, the results of the detection by the sensor block 609 are outputted to the control block 610.

On the basis of the change in the user line-of-sight direction, shaking and nodding of the head (looking right or left and up and down), or attitude detected by the sensor block 609, the control block 610 sends an instruction of change in the line-of-sight direction in which to view an all-sky video being received through the communication block 601. In addition, the control block 610 sends a user audio instruction picked up with the sound pickup block 607 to the video providing apparatus via the communication block 601 without change or after converting this audio instruction into text information or command information.

Further, if user operations of line-of-sight direction, head, and attitude (or not only the head but also gesture operations using the body and hands and legs) are manipulations done on the UI and OSD on the screen, then the control block 610 executes the processing on the display video of the display block 606 in accordance with these manipulations.

The external device interface (IF) 611 connects external devices to the information processing apparatus 600 in accordance with interface standards such as USB (Universal Serial Interface) and so on. For example, the information processing apparatus 600 is capable of connecting known input devices (not depicted) such as a keyboard and a mouse, a touch panel, a joystick, a game controller and so on to the external device interface 611. These types of input devices may be used for inputting manipulations done on UI and OSD on the screen of the display block 606 and for issuing instructions for moving positions at which an all-sky video is taken and switching between line-of-sights.

C. Viewing Archive Video

In item A mentioned above, a mechanism by which a real video taken real-time with a video providing apparatus was viewed with the video reproducing apparatus was described. By contrast, an embodiment is also practicable in which a video taken with a video providing apparatus is recorded to an external apparatus (a distribution server) once and the video reproducing apparatus side views the archive video received from the external apparatus.

Reasons why archive videos are viewed are various. For example, there are cases in which customers desire to make confirmation of properties in time zones that are different from the time of viewing as with the case in which, since a customer is busy in the daytime and therefore can visit a real-estate shop only in the evening, the customer privately views properties by viewing the archive videos of properties taken in the daytime beforehand or, conversely, the case in which customers who viewed the daytime real videos of properties want to see the nighttime sceneries thereof, for example. Further, there may be the case in which customers desire to view the videos of properties taken in different natural conditions such as rain. In addition, customers may view the videos of properties taken in different seasons in the same time zone. Alternatively, there may be the case in which, as with popular properties, accesses from many video reproducing apparatuses are concentrated to a particular video providing apparatus, thereby allowing the transmission of real videos to not all video reproducing apparatuses due to limited transmission band.

Figure 7:
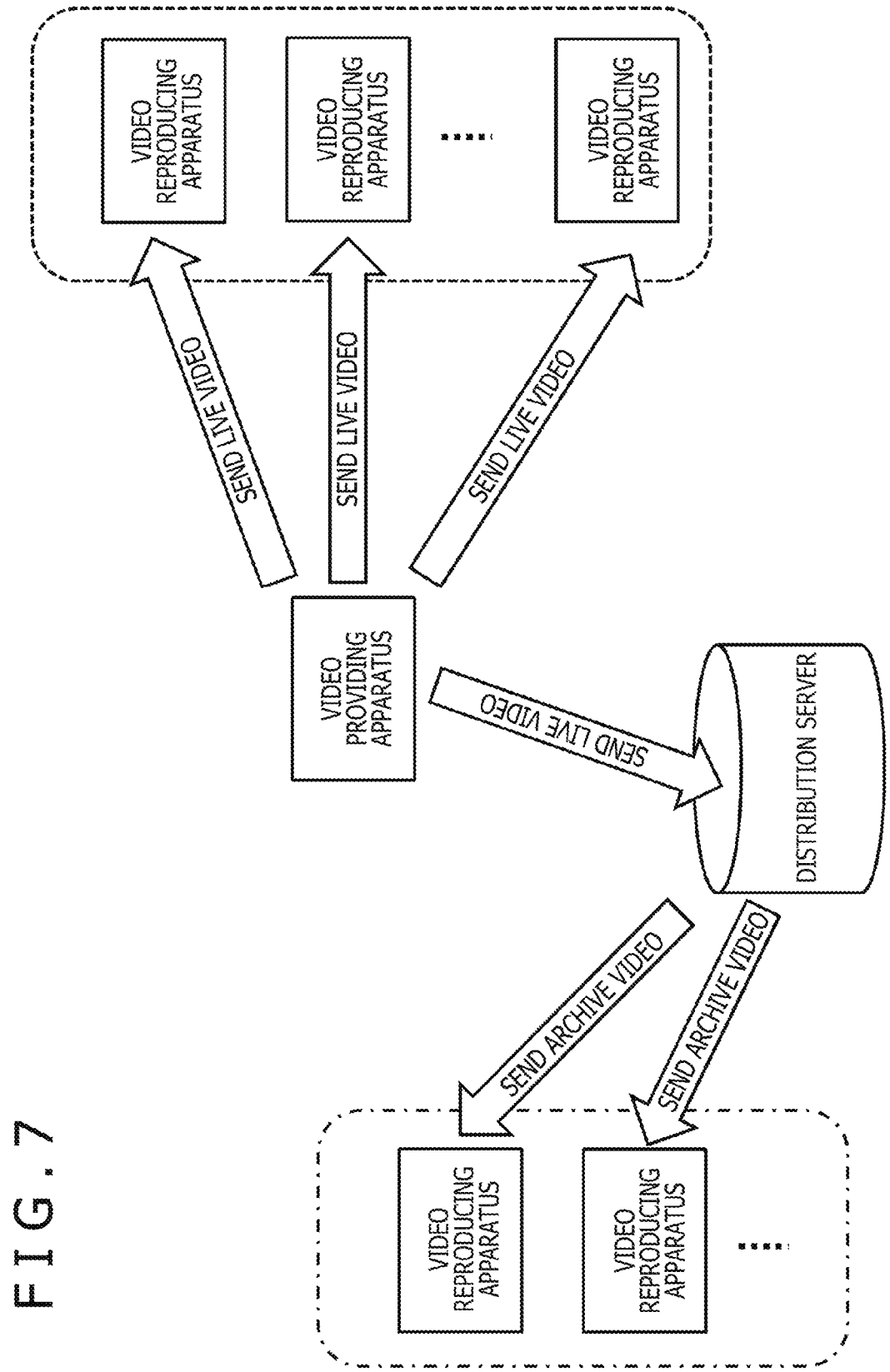
FIG. 7 is a diagram for describing a mechanism of viewing archive videos.

FIG. 7 illustrates a mechanism by which real-time videos are not sent from a video providing apparatus directly to video reproducing apparatuses, but archive videos recorded to an external apparatus are distributed to video reproducing apparatuses.

An external apparatus as referred to here denotes, for example, a recording server installed physically independently of a video providing apparatus so as to record videos. By letting a recording server do the video distribution to the video reproducing apparatuses excluded as excess apparatuses at the time or in the time zone specified by the video reproducing apparatus side, the load of the video providing apparatus can be dispersed. Further, although the video reproducing apparatuses excluded as excessive is not allowed the live viewing of videos taken at the place (the viewpoint position) of installation of a video providing apparatus, but these videos can be relived as long as a time delay permits.

A real video taken with each video providing apparatus is also sent to a recording server. The recording server records the received video as linked with the information for identifying the video providing apparatus from which the video was received or the information for identifying the image-taking viewpoint position (the property in which the video providing apparatus is installed or the room inside the property), the time zone in which the video was taken, and the environment in which the video was taken. When a send start request for the instruction for switching between image-taking environments such as time zone, season, and weather comes from a video reproducing apparatus, the sending of the real video from the video providing apparatus is switched to the sending of the archive video recorded to an external apparatus.

D. Private Viewing of Real-Estate Properties

FIG. 8 illustrates an example in which the video viewing system 100 is applied to the private viewing of real-estate properties. Reference numeral 801 is indicative of a user (a person privately viewing properties or a sales person of a real-estate company) who is at a real-estate property (a local site), this user having or wearing a video providing apparatus (described above). On the other hand, reference numeral 802 is indicative of a user who does not visit a local site but browses the information associated with properties from a place away from the local site (for example, a shop of a real-estate company or the home), viewing the video of a properties taken with the video providing apparatus by use of the video reproducing apparatus (described above).

Figure 9:
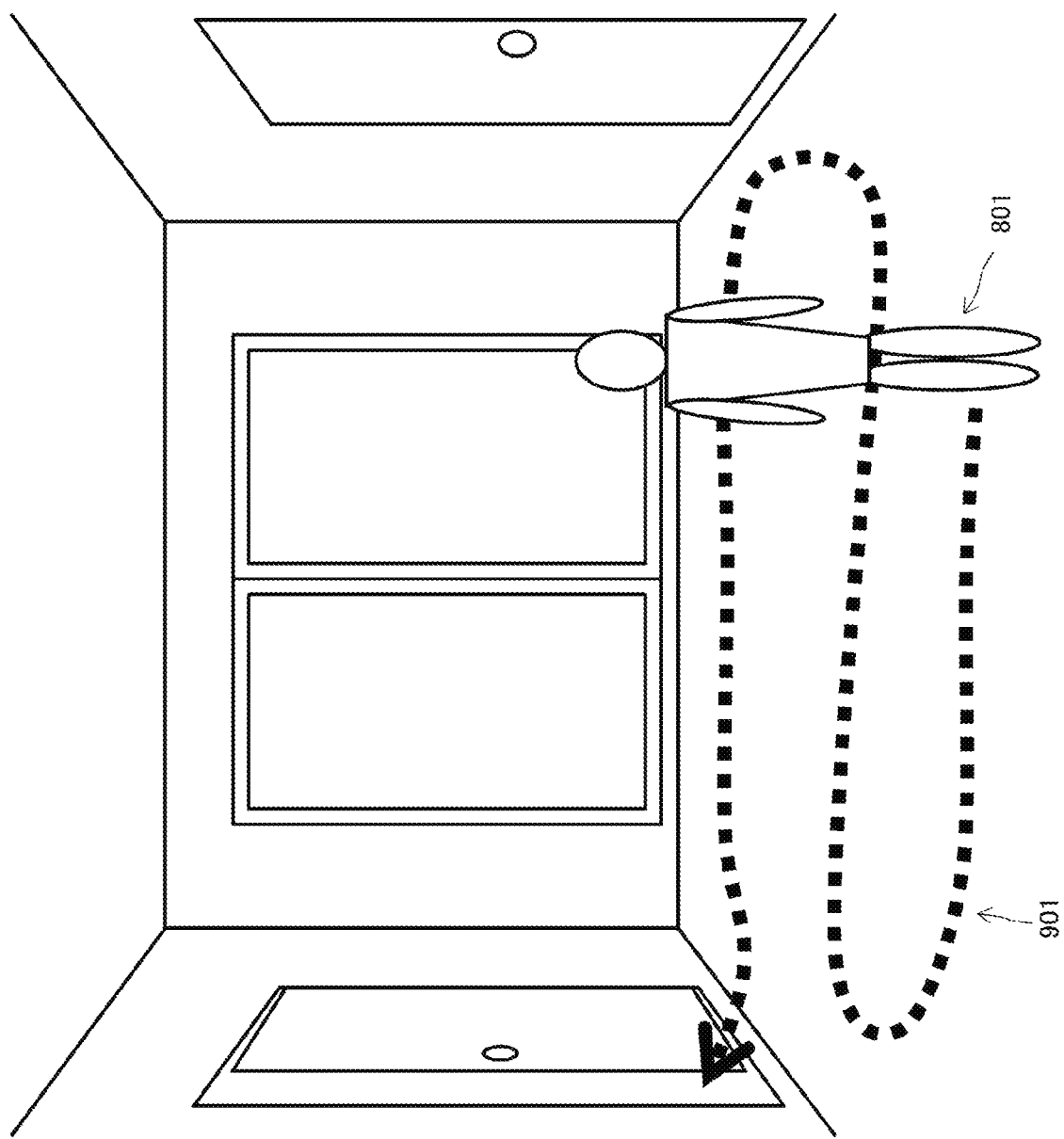
FIG. 9 is a diagram illustrating another example in which the video viewing system 100 is applied to the private viewing of real-estate properties.

As indicated with reference numeral 901 depicted in FIG. 9, while walking around properties, the user 801 explains the locational conditions and layouts of properties and facilities and talks about the impressions and, further, opens doors to walk into other rooms. Since the user 802 can view, with nearly actual feeling, the real video of properties even without visiting the local site, the user 802 can realize efficient private viewing. That is, applying the video viewing system 100 to private viewing enhances customer satisfaction.

E. Real-Time Communication Involving Temporal and Spatial Lags

It is desirable that the user 802 side is able to view real-time a video taken by the user 801 who does private viewing of a property (or who accompanies private viewing). In reality, however, there is a time lag (namely, a temporal difference) of several seconds to several tens of seconds (approximately 40 seconds for example) during an interval between the encoding of a video by a video providing apparatus to send the encoded video to a distribution server and the receiving of the video from the distribution server by the video reproducing apparatus and the decoding of the received video to be outputted for display. Hence, temporal and spatial lags (differences) are caused between the video taken and audio picked up by a video providing apparatus and the video and the audio viewed on a video reproducing apparatus side. In addition, temporal and spatial lags are caused also between the video taken and the audio picked up by a video providing apparatus and the annotation information added to the received video on the video reproducing apparatus.

A temporal lag denotes that a video viewed on the video reproducing apparatus side has a time lag. A video to be viewed is not real-time to be exact; namely, the video was taken several seconds to several tens of seconds before. Audio has also a time lag. That is, the audio of the user 801 such as the description of property locational conditions, room layouts, and facilities and the impressions of properties at the site is heard several seconds to several tens of seconds later on the video reproducing apparatus side. Further, if the user 802 viewing a video of properties with the video reproducing apparatus gives audio instructions such as "I want to see the scenery from the veranda," "Show me the living room," and so on, this instruction is about the video several seconds to several tens of second before for the user 801 who is taking a video of properties with the video providing apparatus.

Further, a spatial lag is caused if the user 801 moves around as shown in FIG. 9 during a time lag of several seconds to several tens of seconds in which a video is taken by a video providing apparatus and the taken video is outputted by a video reproducing apparatus for display. On the video reproducing apparatus side, the video taken several seconds to several tens of seconds before by the video providing apparatus is viewed, thereby causing a spatial lag in which there is no match with a video being taken at the current site of the video providing apparatus. For example, even if the user 802 gives audio instructions such as "I want to see the scenery from the veranda," "Show me the living room," and so on, these instructions were directed to the place at which the user 801 was positioned several seconds to several tens of seconds before, thereby possibly making it hard for the user 801 to understand these instructions at the current site. For example, in the case of an audio instruction such as "Look at this door" that includes a pronoun, if the user 801 has already moved to another room, the door indicated by the user 802 becomes another door.

As described above, the real-time communication between a video providing apparatus and a video reproducing apparatus involves temporal and spatial lags. Hence, even if the user 801 receives audible instructions from the user 802, the user 801 cannot sometimes correctly understand these instructions.

Figure 10:
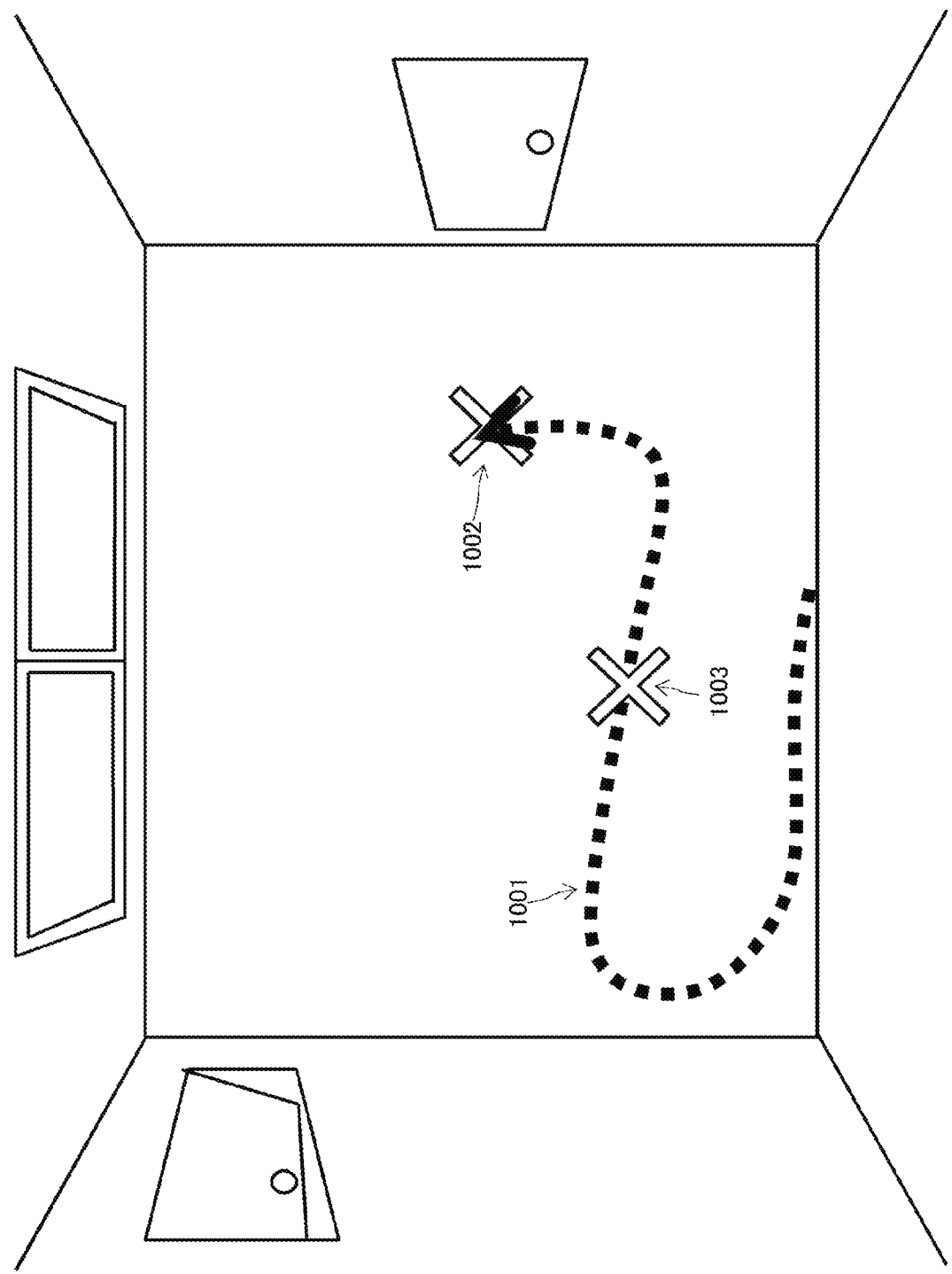
FIG. 10 is a diagram illustrating a travel route of a video providing apparatus at a real-estate local site.

For example, it is assumed that, in a property of local site, a video taken by a video providing apparatus along a route as shown with reference numeral 1001 in FIG. 10 be sent to a video reproducing apparatus via a distribution server and, at the video reproducing apparatus, a video having temporal and spatial lags caused by a time difference of 40 seconds be displayed. At time T, while the video providing apparatus has moved to a place indicated by reference numeral 1002 at the local site, a video taken at a place 1003 that the user passed by 40 seconds before time T is displayed at the video reproducing apparatus side.

Even if the user of the video reproducing apparatus asks a question at time T about a video viewed by this user (for example, sending a question about the information of such details of a property as facilities (kitchen, fittings, and so on) displayed in the video), the user of the video providing apparatus side has already moved to the place 1002 after passing the place 1003, so that the question by the user of the video reproducing apparatus may be incomprehensible to the user of video providing apparatus. Especially, questions using pronouns such as "this" and "that" are difficult to understand.

Therefore, the following describes a technology of supporting the realization of real-time communication between the user of a video providing apparatus and the user of a video reproducing apparatus by correctly notifying the user of the video providing apparatus of the contents of instructions if the instructions have been given to a video having temporal and spatial lags.

Figure 11:
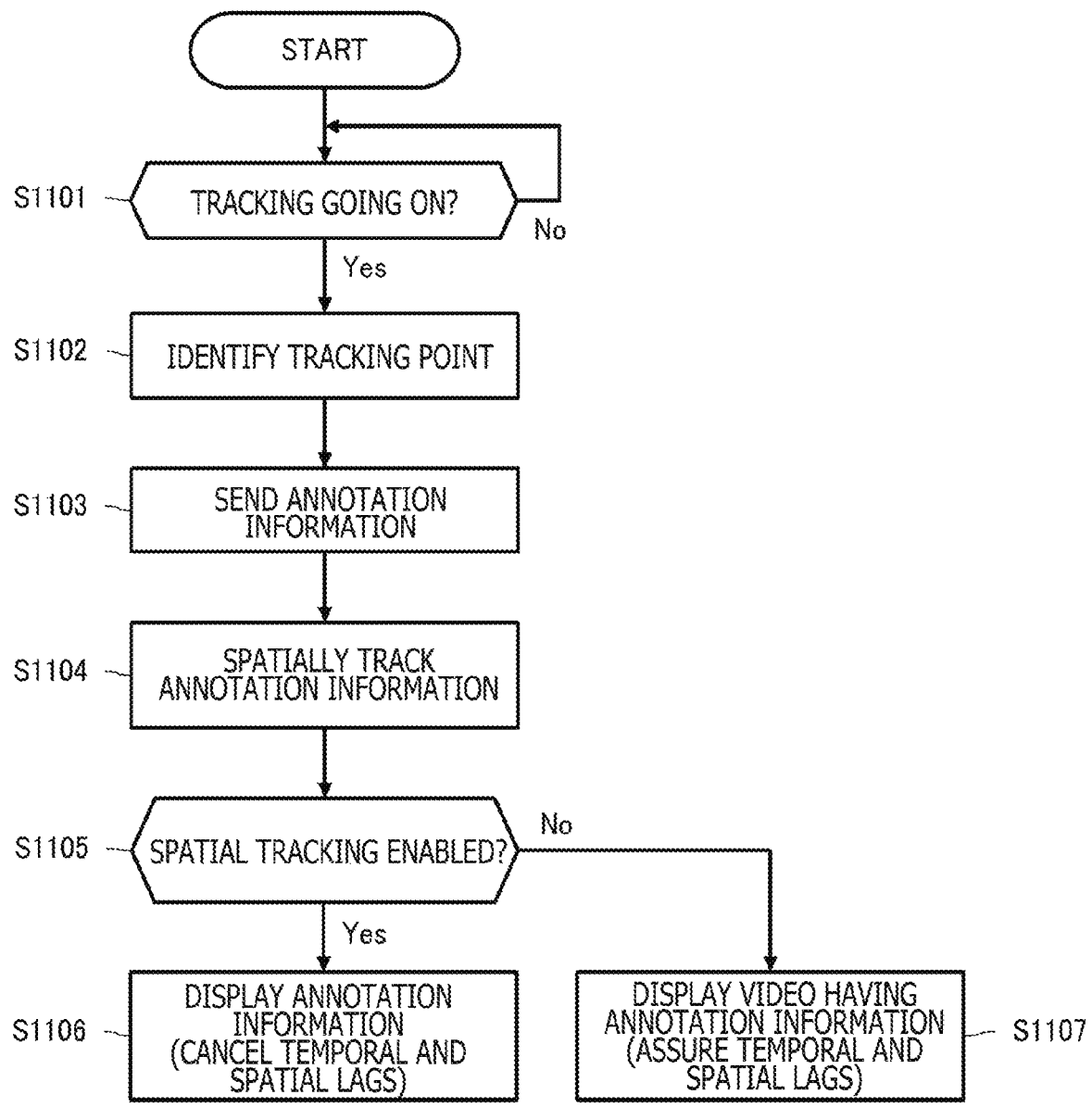
FIG. 11 is a flowchart indicative of a processing procedure for notifying a video providing apparatus of the information indicated for a video having temporal and spatial lags on the video reproducing apparatus side.

Referring to FIG. 11, there is shown a flowchart indicative of a processing procedure of notifying a video providing apparatus of the information given to a video having temporal and spatial lags at the video reproducing apparatus side. It should be noted however that this processing procedure is based on the premise that the video providing apparatus side be capable of confirming the comment and annotation information from the user of the video reproducing apparatus by the display block 510.

First, if the user of the video reproducing apparatus side is tracking some object displayed on the display block 606 (Yes in step S1101), then that tracking point is identified (step S1102).

If the user is indicating the tracking point by use of user interface such as a mouse pointer or a touch panel, the object can be identified with ease. Further, if the user audibly indicates an object that is tracked by the user like "Look at this door," the tracking point (in the case of "Look at this door," which door is indicated) is identified, for example, in the UI processing and the control block 609 on the basis of the results of the language analysis done on the input audio and the results of the image recognition done on the display video of the display block 606.

Figure 12:
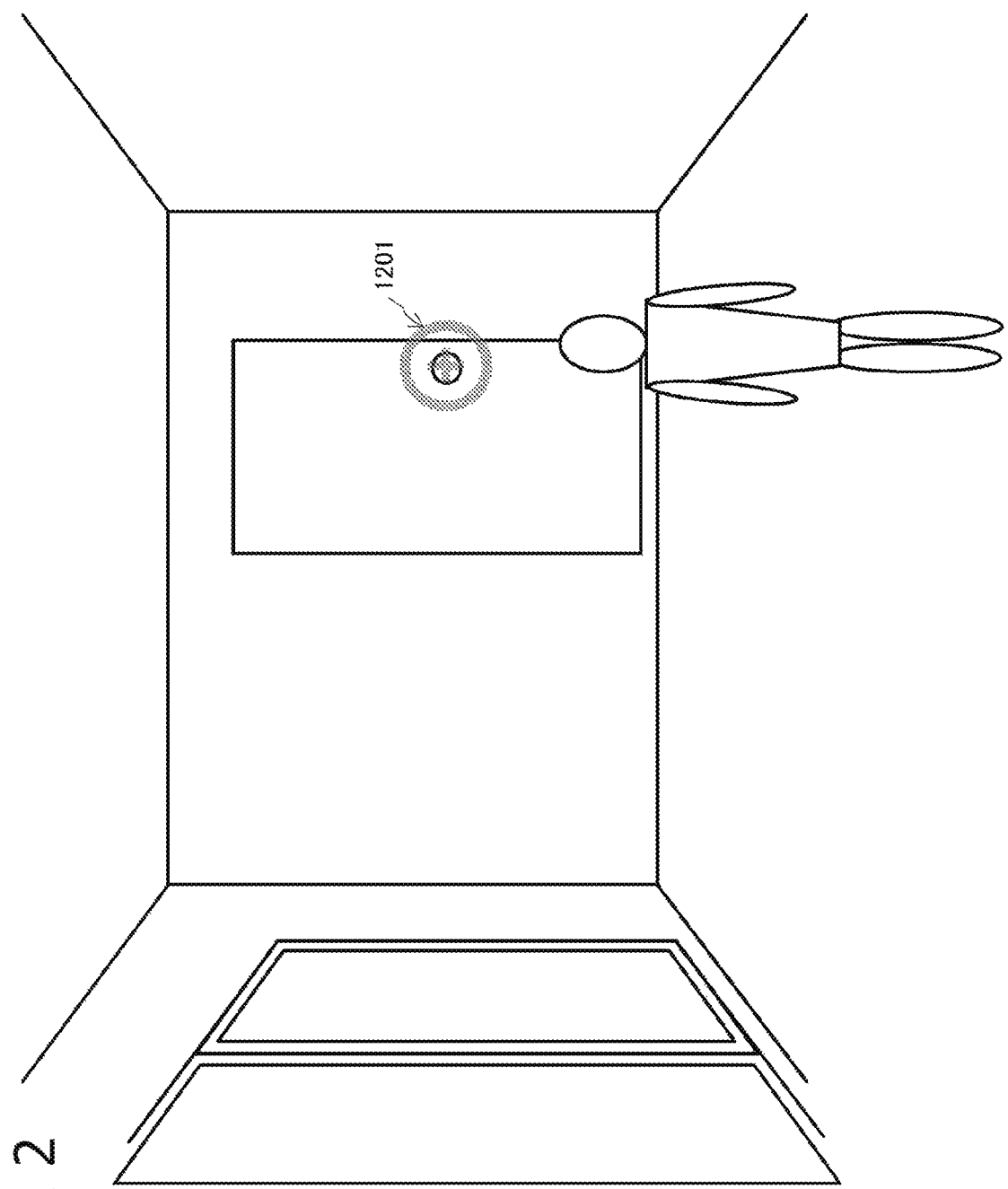
FIG. 12 is a diagram illustrating a video with annotation information 1201 attached to a tracking point of a user.

Next, the video reproducing apparatus sends the annotation information attached to the tracking point to the video providing apparatus (step S1103). The annotation information is also displayed on the display block 606 of the video reproducing apparatus. Referring to FIG. 12, there is illustrated a video with annotation information 1201 attached to the tracking point of the user. The video reproducing apparatus may send the video attached with the annotation information to the video providing apparatus.

On the other hand, at the video providing apparatus side, it is determined whether the tracking point is within the view field of the user of the current video providing apparatus; in other words, the spatial tracking of the annotation information is attempted (step S1104), thereby checking whether the spatial tracking is enabled or not (step S1105).

In step S1104, image matching may be executed between the video having the annotation information received from the video reproducing apparatus and the video (or the video of the view field of the user of the video providing apparatus) being taken with the image-taking block 501, thereby finding out a subject attached with the annotation information in the current video so as to identify the tracking point. Alternatively, if an amount of time lag is known (if a video displayed on the video reproducing apparatus is one taken 40 seconds earlier, for example), then the tracking point at a position of time earlier by the time lag of the video providing apparatus may be converted into the tracking point at the current position of the video providing apparatus.

If it is enabled to track, at the video reproducing apparatus side, the tracking point attached with the annotation information within an image currently being taken with the image-taking block 501, namely, if spatial tracking is enabled (Yes in step S1105), then that tracking point is converted into a corresponding position on the current taken video. Then, the annotation information is overlaid for display on the tracking point on the current taken video of the video providing apparatus (step S1106).

Figure 13:
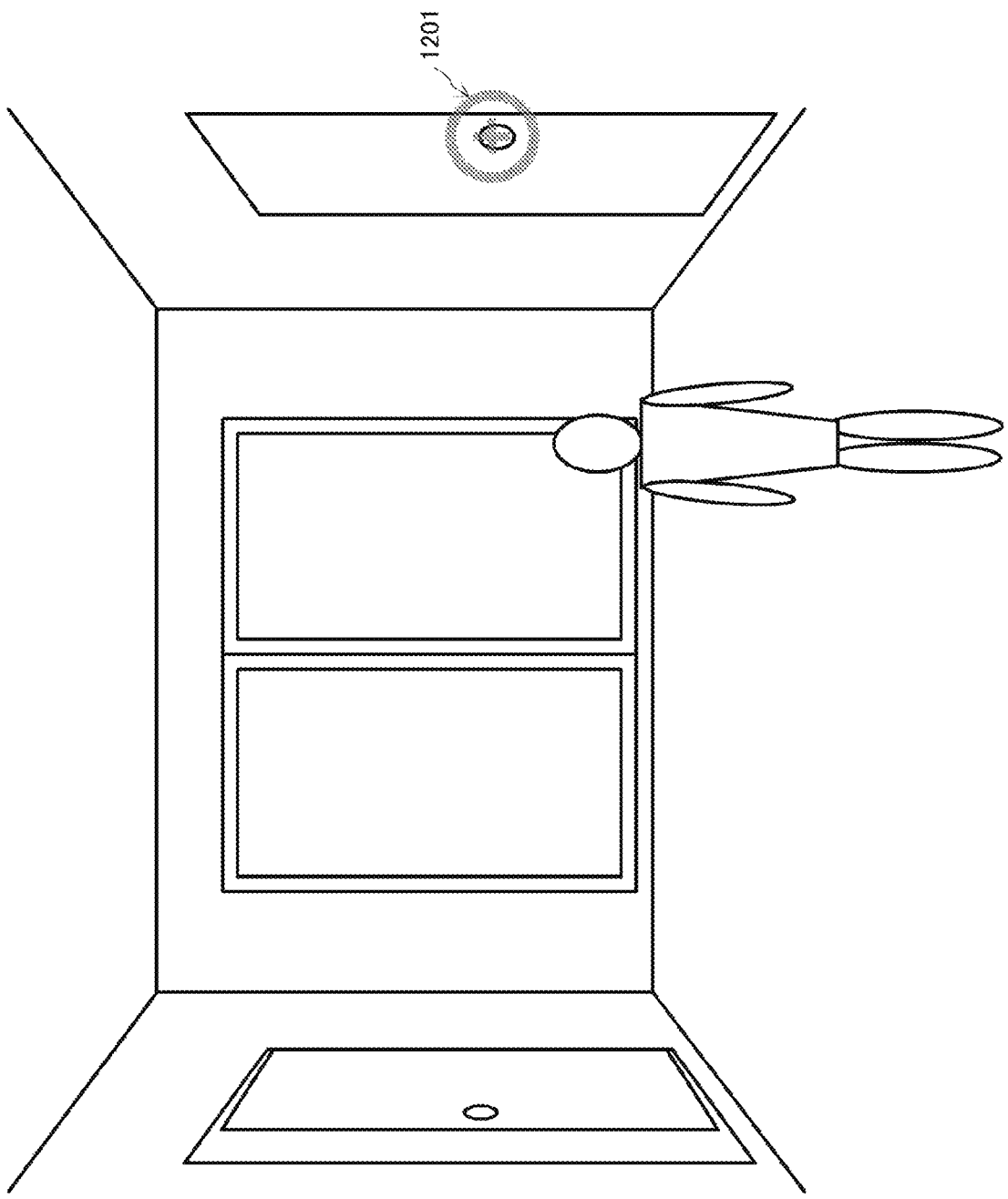
FIG. 13 is a diagram illustrating an example in which the annotation information attached by a video reproducing apparatus onto the current video of a video providing apparatus.

Referring to FIG. 13, there is illustrated an example in which annotation information 1301 attached by the video reproducing apparatus is displayed on the current taken video of the video providing apparatus. As illustrated, the annotation information 1301 is displayed by cancelling the temporal and spatial lags.

On the other hand, if it is disabled to track, at the video reproducing apparatus side, the tracking point attached with the annotation information within an image currently being taken with the image-taking block 501; namely, if spatial tracking is disabled (No in step S1105), then, by use of the past video at which the annotation information was attached, the annotation information is displayed on the display block 510 of the video providing apparatus, thereby ensuring the temporal and spatial lags (step S1107).

For example, if the video providing apparatus (the user thereof) has already moved to another room, the annotation information cannot be tracked in the current space. Although it is not the room where the video providing apparatus (the user thereof) is at present, by viewing the transmitted video attached with the annotation information, the user of the video providing apparatus can understand what is indicated by the video reproducing apparatus side.

According to the technology disclosed herein, the transmission of videos of real-estate properties, for example, can be suitably controlled. Further, according to the technology disclosed herein, real-time videos or archive videos of real-estate properties, for example, can be suitably viewed, thereby realizing the private viewing with a sense of reality even at locations remote from properties.

INDUSTRIAL APPLICABILITY

While preferred embodiments of the present invention have been described using specific terms, such description is for illustrative purpose only, and it is to be understood by those skilled in the art that changes and variations may be made without departing from the spirit or scope of the following claims.

In the present description, embodiments in which the technology disclosed herein is applied to a real-estate property private viewing system have mainly been described; however, the gist of the technology disclosed herein is not limited thereto. The technology disclosed herein is applicable to the video transmission in a variety of industrial fields. For example, the technology disclosed herein is applicable to the task support, care support, and temporary staffing in a variety of industrial fields, such as medial practices including surgical operation, building practices including civil engineering, operations of aircraft and helicopter, navigation for car drivers, and instruction and coaching of sports. In addition, the technology disclosed herein is useful in concert and sport watching and SNS (Social Network Services).

In its essence, the technology disclosed herein has been described only as illustrative and therefore the contents hereof should not be interpreted as restrictive. For the judgment of the gist of the technology disclosed herein, the scope of claims should be put into consideration.

It should be noted that the technology disclosed herein may take the following configuration.

(1) An information processing terminal apparatus including:
    an image-taking block;
    a sending block configured to send an image taken by the image-taking block;
    a receiving block configured to receive a predetermined signal from an external device;
    a display block; and
    a control block,
    in which, on a basis of temporal or spatial difference between information included in the predetermined signal and an image currently being taken with the image-taking block, the control block makes the display block display the information.

(2) The information processing terminal apparatus according (1) above,
    in which the receiving block receives additional information for an object identified by the external device, and
    the control block controls displaying of the additional information on the basis of the temporal or spatial difference.

(3) The information processing terminal apparatus according to (2) above,
    in which, on a basis of whether tracking of the object is enabled within an image currently being taken with the image-taking block, the control block controls displaying of the additional information on the basis of the temporal or spatial difference.

(4) The information processing terminal apparatus according to (2) above,
    in which the control block converts the object that is trackable into a position on an image currently being taken with the image-taking block, thereby causing the additional information to be displayed on the converted object.

(5) The information processing terminal apparatus according to (2) above,
    in which the control block causes additional information for the object that is not trackable within an image currently being taken with the image-taking block to be displayed by use of a video of a point of time at which the object is displayed.

(6) The information processing terminal apparatus according to (2) above, in which the additional information includes annotation information that is inputted in the external device.

REFERENCE SIGNS LIST

100 . . . Video viewing system
101 . . . Video providing apparatus, 102 . . . Video reproducing apparatus
200 . . . Video viewing system
201 . . . Video providing apparatus, 202 . . . Video reproducing apparatus
300 . . . Video viewing system
301 . . . Video providing apparatus, 302 . . . Video reproducing apparatus
400 . . . Video viewing system
401 . . . Video providing apparatus, 402 . . . Video reproducing apparatus
500 . . . Information processing apparatus (video providing apparatus)
501 . . . Image-taking block, 503 . . . Video encoding block
504 . . . Audio input block, 505 . . . Audio encoding block
506 . . . Multiplexing block, 507 . . . Communication block, 508 . . . Video decoding block
509 . . . Image processing block, 510 . . . Display block, 511 . . . Audio decoding block
512 . . . Audio output block, 513 . . . Control block
600 . . . Information processing apparatus (video reproducing apparatus)
601 . . . Communication block, 602 . . . Demultiplexer (DEMUX)
603 . . . Audio decoding block, 604 . . . Audio output block
605 . . . Video decoding block, 606 . . . Display block
607 . . . Sound pickup block, 608 . . . Audio encoding block, 609 . . . Sensor block
610 . . . Control block, 611 . . . External device interface

The invention claimed is:

1. An information processing terminal apparatus, comprising:
   an image-taking block;
   a sending block configured to send a first image taken by the image-taking block;
   a receiving block configured to:
      receive a signal from an external device; and
      receive additional information for an object identified by the external device;
   a display block; and
   a control block, wherein the control block is configured to:
      control the display block to display information included in the received signal, wherein the display block is controlled based on a temporal difference or a spatial difference between the information included in the received signal and a second image currently taken with the image-taking block; and
      control display of the additional information based on the temporal difference or the spatial difference, wherein the additional information for the object that is untrackable within the second image currently taken with the image-taking block is displayed based on a video of a point of time at which the object is displayed.

2. The information processing terminal apparatus according to claim 1, wherein, based on enablement of tracking of the object within the second image currently taken with the image-taking block, the control block is further configured to control the display of the additional information based on the temporal difference or the spatial difference.

3. The information processing terminal apparatus according to claim 1, wherein
   the control block is further configured to convert the object that is trackable into a position on the second image currently taken with the image-taking block, and
   control the display of the additional information on the converted object.

4. The information processing terminal apparatus according to claim 1, wherein the additional information includes annotation information inputted in the external device.

* * * * *